United States Patent [19]
Boruschewitz et al.

[11] 3,978,279
[45] Aug. 31, 1976

[54] METHOD AND APPARATUS FOR SIMULTANEOUSLY MODULATING WITH PICTURE, SOUND AND COLOR SIGNALS THE INCIDENCE OF A RECORDING LIGHT BEAM ON A MOVING RECORD MEDIUM

[75] Inventors: Manfred Boruschewitz; Klaus Kulle, both of Berlin, Germany

[73] Assignee: Robert Bosch G.m.b.H., Stuttgart, Germany

[22] Filed: Apr. 2, 1975

[21] Appl. No.: 564,340

[30] Foreign Application Priority Data
Apr. 13, 1974 Germany............................ 2418175

[52] U.S. Cl. .................... 178/6.6 DD; 179/100.3 V; 358/4; 360/19
[51] Int. Cl.² ......................................... H04N 5/76
[58] Field of Search............ 178/6.6 R, 6.6 D, 6.7 A; 358/4, 6; 360/19, 30; 179/100.3 V, 100.4 M, 100.4 C

[56] References Cited
UNITED STATES PATENTS
3,800,100  3/1974  Runge ........................ 179/100.4 M
3,829,605  8/1974  Dickopp ................................. 358/4
3,830,968  8/1974  Redlich et al. ......................... 360/19
3,893,163  7/1975  Wessels et al. ......................... 358/4
3,911,476  10/1975  Keizey .................................... 358/4

OTHER PUBLICATIONS

Signal Processing in the Philips "VLP" System, Philips Tech. Rev. vol. 33, pp. 181–185, 10/73, No. 7.

Primary Examiner—Raymond F. Cardillo, Jr.
Attorney, Agent, or Firm—William R. Woodward

[57] ABSTRACT

The picture signal and one of the other two signals (sound, color) frequency modulate a carrier and a subcarrier respectively which in turn modulate the incidence of a light beam cutting a transparent track through a metal film covering a transparent record medium moved past the light source. The frequency modulated carriers produce back and forth movement of the light beam aligned with the direction of transport of the record medium past the light source. The third signal modulates the duty cycle of one of the carriers.

6 Claims, 5 Drawing Figures

METHOD AND APPARATUS FOR SIMULTANEOUSLY MODULATING WITH PICTURE, SOUND AND COLOR SIGNALS THE INCIDENCE OF A RECORDING LIGHT BEAM ON A MOVING RECORD MEDIUM

This invention relates to a method and apparatus for multiplex modulation of the incidence of a radiant energy beam on a movable recording medium to produce a single track optical record, recording a picture signal and at least two other signals, usually signals related to the picture, such as a sound signal and a color signal. In the case of color pictures, as is well known, the basic picture signal is the luminance signal from which a black and white picture can be reproduced when the other signals are missing or when means for their utilization are not available in the receiver, and the color information is provided by a so called chrominance signal which in itself is a composite signal containing two of the difference signals that can be derived from three original color signals. For convenience the chrominance signal may be referred to as if it were just one signal, commonly called a color signal.

It has recently become possible to record a color picture signal such as is used in television, along with its associated sound signal, by a video disc recording device in which a radiant energy beam, particularly a laser beam, produces a signal track in the conventional spiral form on a rotating disc. A similar system may be used for producing a helical track on an endless tape belt. For such systems a high frequency carrier wave simultaneously modulated in frequency or amplitude by the picture, color and sound signals in separate video ranges is used for applying the signals to a record. The carrier frequency for such purposes must be rather high, which produces certain difficulties regarding the guiding of the radiant energy beam on the intended signal path or track and with regard to stabilization of the rotation frequency of the disc.

It is an object of the present invention to provide a method and apparatus by which it will be possible to superimpose at least one of the three kinds of signals by modulation independent of the others and thereby to reduce the modulation bandwidth or the frequency of the aforesaid carrier frequency.

SUBJECT MATTER OF THE PRESENT INVENTION

Briefly, the picture signal, which is to say the luminance signal in the case of a color picture signal, and one of the other related signals, particularly either the color signal or the sound signal, are simultaneously caused to modulate the frequency of a carrier wave that is caused to modulate the incidence of the radiant energy beam, typically a light beam capable of burning holes in a thin metal film in a short time, on the moving record medium by changing the form or position of the radiant energy beam during recording, whereas a third signal, typically the sound or color signal, is used to modulate the duty cycle of a frequency modulated wave or wave component affecting as aforesaid the incidence of the radiant energy beam on the record medium. It is particularly advantageous, in accordance with the invention, to provide the modulation of the incidence of the wave on the recording medium by producing movement of the radiant energy beam back and forth in alignment with the direction of movement of the recording medium past the light beam, the back and forth movement being controlled by a frequency modulated and duty cycle modulated carrier wave as aforesaid. A practical embodiment of a modulator controlling such movement of a recording light beam utilizes an astable multivibrator to which duty cycle modulation is applied by oppositely changing the rates at which the respective timing capacitors of the multivibrator are charged and frequency modulation by simultaneously changing in the same sense the value of the resistances associated with the aforesaid capacitances. The result of this modulation is then a signal track of approximately the following type: in recording on a transparent video disc provided with a thin vapor-deposited metal layer thereon, a series of elongated openings are produced by the radiant energy beam along the record track having a spatial sequence frequency determined by the frequency modulated frequency of the carrier wave. For example, frequency modulation of the carrier and of a subcarrier can provide the luminance signal and the sound signal or else it can provide the luminance signal and the color signal. The ratio of the length of these openings burned into the signal track to the length of the intervals between successive openings may be referred to as the keying ratio and the percentage of the track burned out may be called the "duty cycle", as that term is commonly used, though "duty factor" might be more accurate. This "keying ratio", unless it is purposely modified, does not practically vary at all during frequency modulation of the carrier wave, as long as the frequency change is not too fast. The "keying ratio" can therefore be advantageously utilized to transmit and record the third signal, in the first above-named case the color signal and the second above-named case the sound signal. This operation is more commonly called "duty cycle modulation" since the related parameter called "duty cycle" is easily expressed as a percentage or as a decimal fraction. The combination of both types of modulation (i.e. frequency and duty cycle) can be accomplished with little or no cross modulation or other disturbances if the sub-carrier frequencies, such as are commonly used, for example, for the sound and color signals, are far from each other in frequency. In the particular case of color television signals, which has been discussed by way of illustration, that is precisely the case.

To produce the pattern of openings in the otherwise opaque or reflective signal track by simply oscillating the light beam back and forth in alignment with the direction of movement of the recording medium past the light beam, use is made of the effect that moving the light beam in the same direction as the movement of the record medium produces a more intensive effect on the sensitive film of the recording medium than movement of the light beam in the opposite direction, so that the former movement results in burning a hole in the film and the latter movement produces an interval between adjacent holes in the film. Such a system involves transforming the duty cycle signal into a corresponding triangular wave. Alternately, the motion of the light beam may follow a square wave of appropriate duty cycle between a range of positions where it is obscured and a range of positions where it is transmitted, dwelling in positions in one or the other of these ranges in accordance with the duty cycle signal. Of course, the frequency modulated signal may also be used to move the light beam transversely of the signal track within a predetermined amplitude or it may be used to modulate the amplitude of the light beam, as for example, by a Kerr cell.

The frequency modulation component to which the duty. cycle modulation is applied is of course preferably a square wave. This may be the main carrier, such as is normally used for the picture signal, or it may be an auxiliary carrier frequency or sub-carrier such as is commonly used for the sound or the color signal.

In the use of multiplex modulation of a video recording signal in accordance with the invention, the advantage of a relatively low bandwidth requirement is obtained, so that the requirement for the constancy of the record speed and th accuracy of tracking be substantially reduced.

The invention will be further described by way of illustrative examples, with reference to the accompanying drawings, in which.

Figure 1:
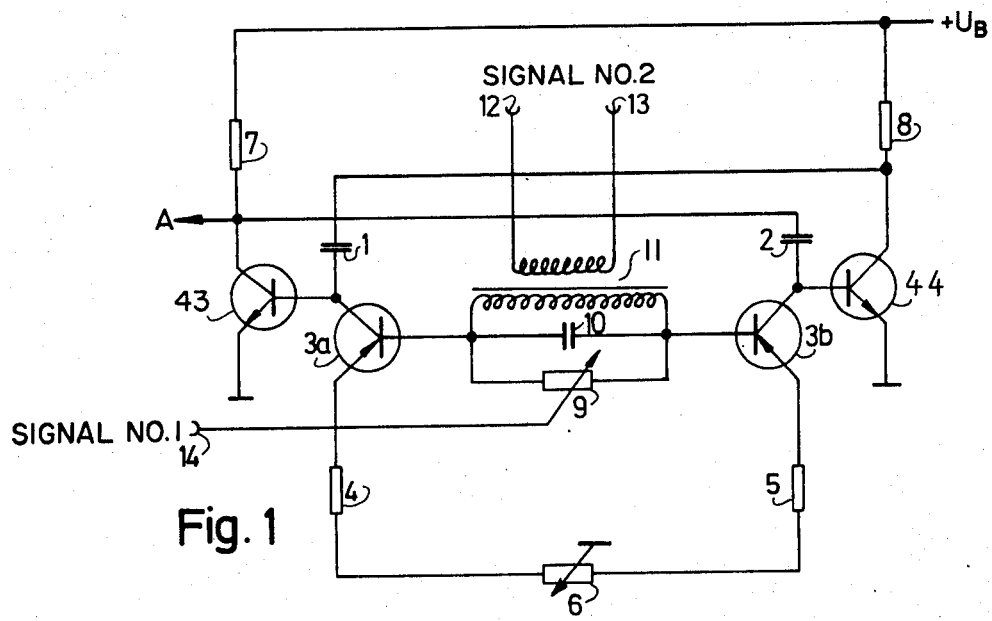
FIG. 1 shows a circuit for modulating a square wave independently in frequency and in duty cycle.

FIG. 1 shows an astable multivibrator with four transistors and with two capacitors 1 and 2 that are periodically discharged and recharged. This portion of the circuit of FIG. 1 is a known form of multivibrator. The time constants for the charge-discharge cycle are determined essentially by the magnitude of these capacitors and by the constant current generators respectively formed by the transistors 3a and 3b and their associated resistors 4, 5 and 6, the resistor 6 being a potentiometer interconnecting the two constant current generators and having a grounded tap for adjustment of the symmetry of the circuit. The actual switching in the multivibrator is provided by the transistors 43 and 44 which are alternately conducting and non-conducting in accordance with the charging conditions of the capacitors 1 and 2 respectively. The output signal can be taken from either of the transistor load resistors 7 and 8, for example at A. In order to modify the frequency of operation the resistance of the RC circuits 3a, 4, 1 and 3b, 5, 2 respectively associated to the two switching transistors are altered in the same sense. That is produced by a signals provided at the input 12, 13 and 14 acting on the network 9, 10, 11. The base electrodes of the transistors 3a and 3b are connected with the respective ends of a secondary winding of a transformer 11, of which the primary winding is furnished with a modulating signal over the input terminals 12 and 13. A capacitor 10 and a potentiometer 9 are connected in parallel across the secondary of the transformer 11 and the tap of the potentiometer 9 is provided with a frequency modulating signal. The frequency modulating signal from the input 14 changes the amount of current through the transistors 3a and 3b simultaneously in the same sense so that resultant frequency is changed while preserving the pulse duty cycle ratio and keying ratio. These transistor current values determine the rate at which the capacitors 1 and 2 alter their charge. On the other hand, a signal applied to the terminals 12 and 13 produces oppositely directed changes of the current through the respective transistors 3a and 3b, so that the keying ratio is changed. In this circuit, under some conditions, a keying ratio in the neighborhood of 1 (i.e. 50% duty cycle) must be avoided, since in that case, a certain change of the frequency can simultaneously occur.

Figure 2:
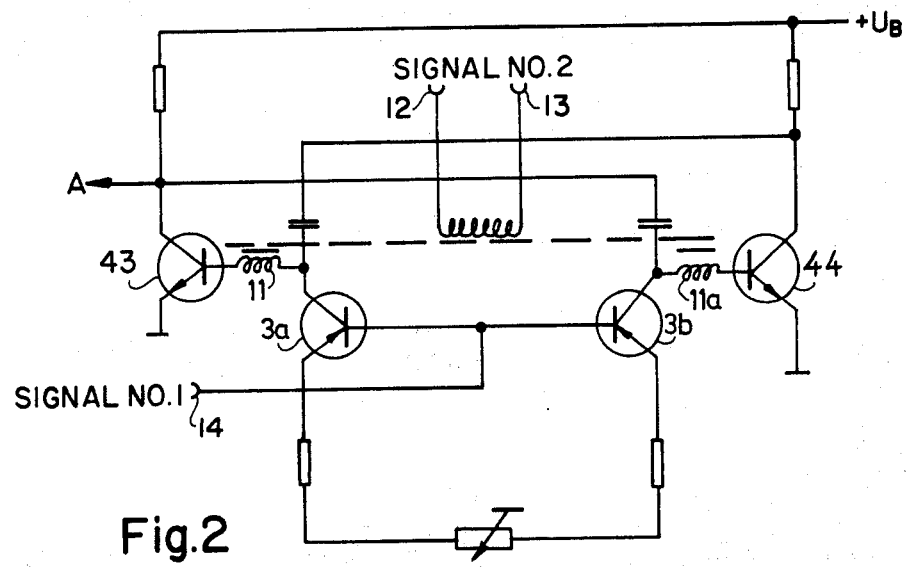
FIG. 2 shows another circuit for modulating a square wave independently in frequency and in duty cycle.

In the circuit of FIG. 2 the secondary of the transformer is composed of two windings 11 and 11a. The voltages produced in the secondary windings shift the operating points of the two switches 43 and 44 of the astable multivibrator in such a way that the duty cycle is influenced. The frequency of the multivibrator does not change as the duty cycle is changed in this way, even for a keying ratio in the neighborhood of one. Frequency modulation is produced by the application of a low frequency signal in the common mode to the base electrodes of the transistors 3a and 3b, since then the two charging times of the switchover circuits of the multivibrator are then changed in the same sense.

Signal No. 2 furnished at inputs 12 and 13 is an alternating current of relatively low frequency compared to the multivibrator output frequency. It makes the charging time of one of the capacitors 1, 2 less and the other more in a continually varying manner about the center value determined by the instantaneous value of Signal No. 1. Thus the time required for one switching transistor to become conducting after being switched off is made shorter while the corresponding time for the other switching transistor is made longer.

The above-described circuits shown in FIGS. 1 and 2 show how it is possible to modulate a square wave independently in frequency and in duty cycle by two different signals respectively. These circuits may be conveniently used for modulating a sub-carrier or auxiliary carrier of a composite picture signal to carry both the color signal, sometimes known as a chrominance signal, and the sound signal, applying one of them as signal No. 1 to the duty cycle modulation input 14 and the other as signal No. 2 to the frequency modulation input 12, 13. The circuit of FIG. 1 or of FIG. 2 is represented by the subcarrier multivibrator oscillator 20 of FIG. 3 and its output is shown furnished to a mixer 21 where it is superimposed upon the picture signal (more properly the luminance signal) to form a combined output which is used to frequency modulate the main carrier oscillator 23, the output of which is recorded optically by a recording device 25 on the moving record 27. As is well known, in television picture signals the information is concentrated about the harmonics of the line scanning frequency, and accordingly the sub-carrier nominal frequency is located midway between two of the higher harmonics of the line scanning frequency to avoid interference with the picture.

Figure 3:
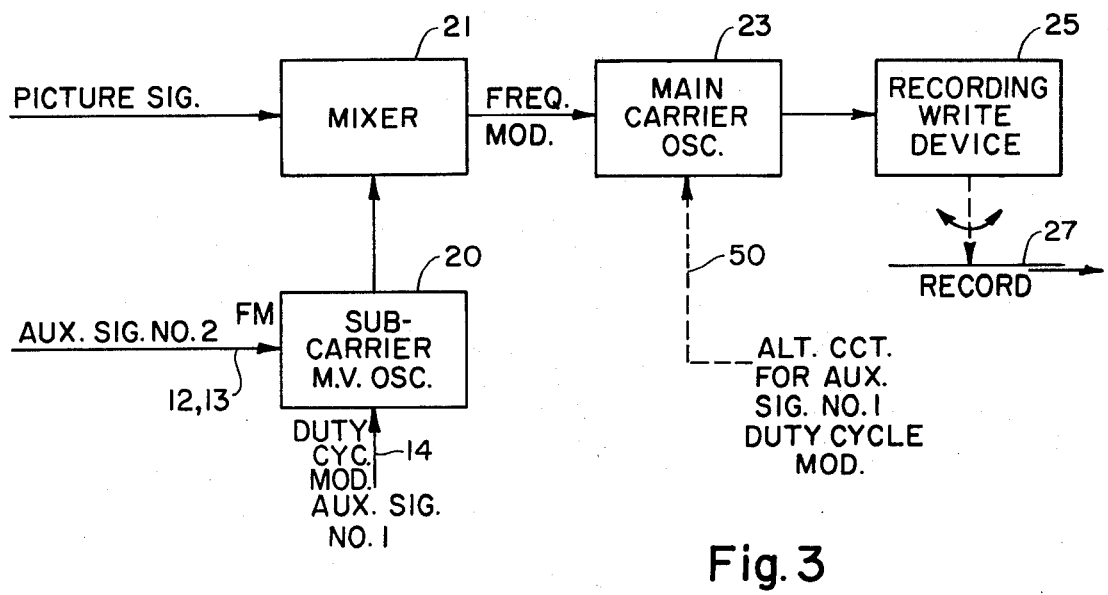
FIG. 3 is a block diagram of a system for recording three signals simultaneously on a single record track, two of them by frequency modulation and a third by duty cycle modulation.
Figure 4:
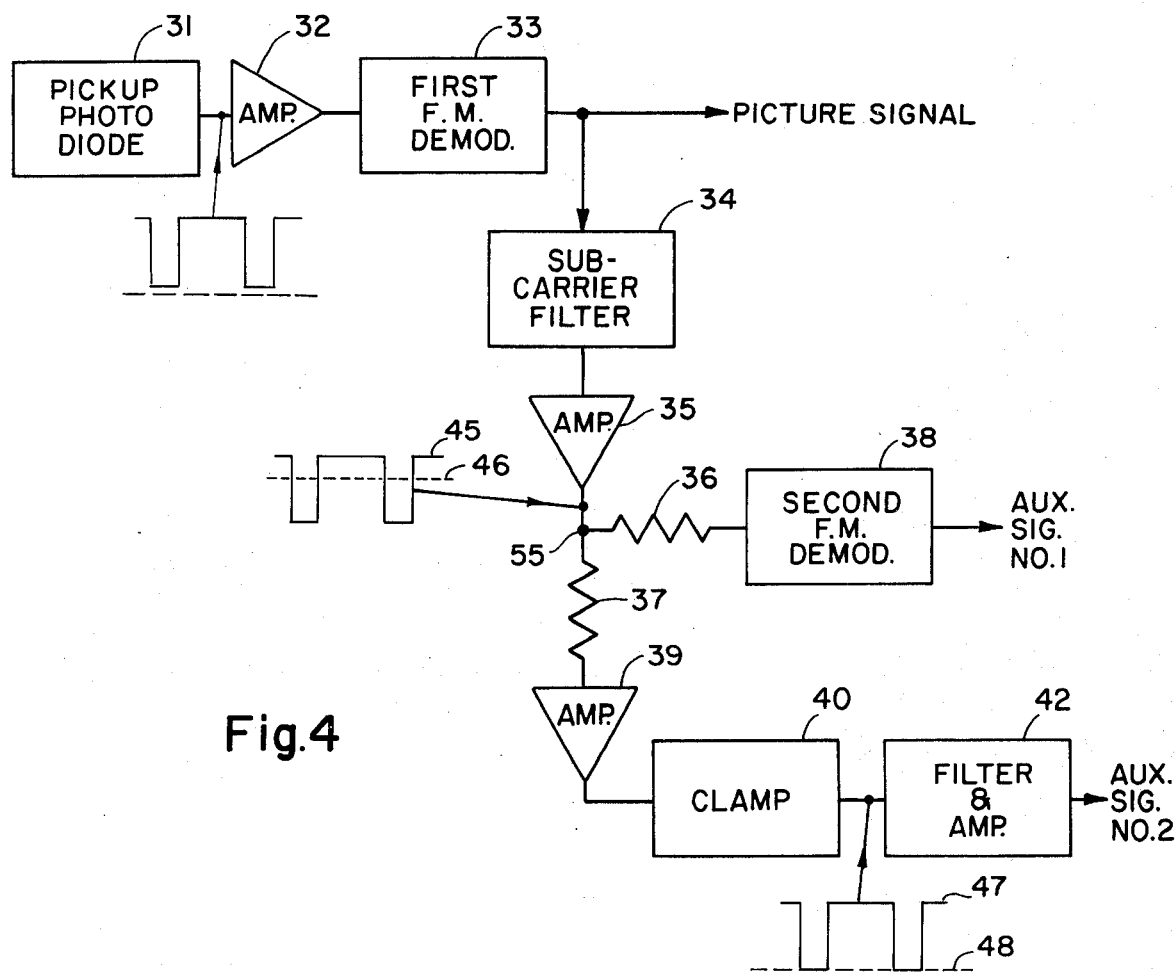
FIG. 4 is a block diagram of a system for de-modulating a composite signal obtained from a record track recorded by the system of FIG. 3.

FIG. 4 shows a system for separating the components of a signal recorded in the manner of FIG. 3. In this circuit the composite signal is picked up by a photo diode 31, the output of which is amplified by the amplifier 32 and supplied to a first FM de-modulator 33, the output of which is branched in one direction to a picture signal output and in the other direction to a sub-carrier filter 34 followed by an amplifier 35 that feeds, through respective de-coupling resistors 36 and 37 a second FM de-modulator 38 which delivers the first auxiliary signal and, on the other hand, an amplifier 39 that drives a clamp circuit 40 from which the second auxiliary signal is obtained after filtering and amplifying in the circuit block 42. In order to obtain a voltage representative of the duty cycle of the square subcarrier wave, it is necessary to clamp the square wave at one of its extreme values. At the input to the clamping stage the wave has the form indicated at 45, swinging back and forth around its average value indicated by the dash line 46. At the output of the clamp circuit 40, however, the wave has the same shape shown by the line 47, but as the duty cycle varies, the minima of the wave continued to be held to the fixed value represented by the dash line 47, and with the minima thus clamped the wave can be converted to a voltage representative of the duty cycle by simple filtering.

Instead of applying auxiliary signal No. 1 by duty cycle modulation to the subcarrier oscillator 20, it could be provided for duty cycle modulation of the main carrier oscillator 23 as shown by the dash line 50 in FIG. 3. In that case the corresponding separation of the signals could be done by connecting the output of amplifier 32 directly to the point 55 of FIG. 4, so that the FM de-modulator 38 would provide the picture signal combined with the subcarrier output and the subcarrier could be separated and de-modulated after being filtered out of the picture channel to provide auxiliary signal No. 1. The auxiliary signal No. 2 would be obtained through the clamp circuit 40 as shown in FIG. 4.

Figure 5:
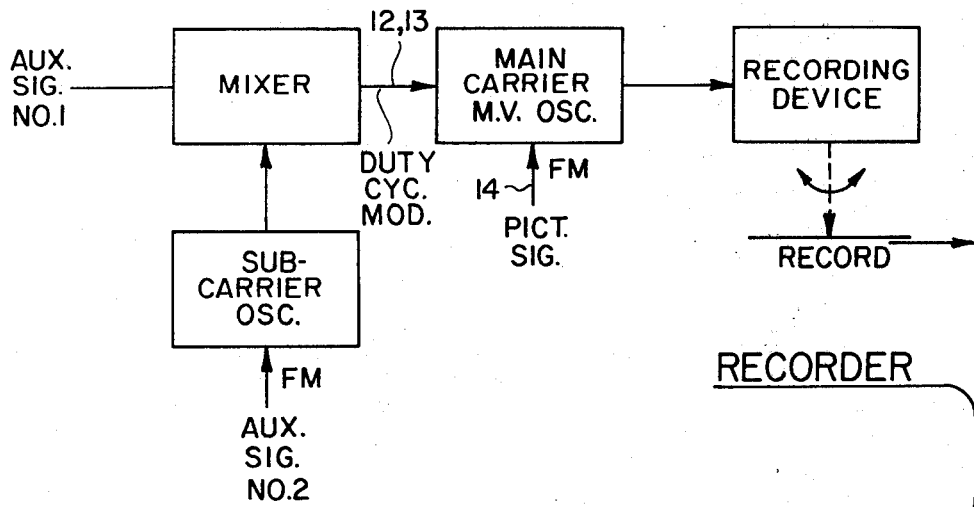
FIG. 5 is a block diagram of another recording apparatus and for de-modulating a composite of another and corresponding playback apparatus.
Figure 5:
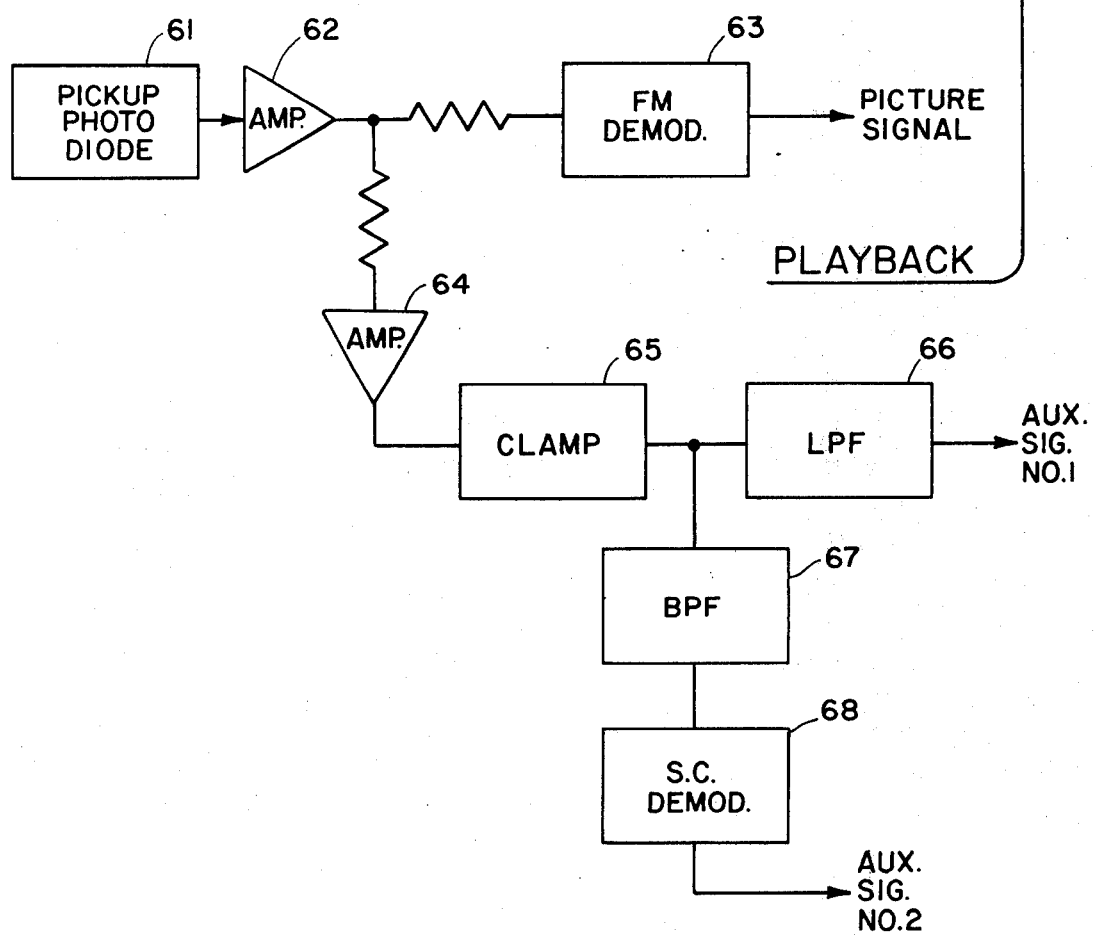

Still a different system is possible for utilizing the invention, as shown in FIG. 5, where a transmitting system is shown in which a multivibrator square wave oscillator of the form shown in FIG. 2 or FIG. 3 is used to generate the main carrier and the subcarrier is made part of auxiliary signal No. 1 which is multiplexed before it is used to modulate the duty cycle of the main carrier. For de-modulating a signal so recorded, the pickup diode 61 provides an output through amplifier 62 both to the FM de-modulator 63 which produces the picture signal and, through a further amplifier 64 to a clamp circuit 65 which feeds both a low pass filter 66 to yield auxiliary signal No. 1 and to a band pass filter 67 which feeds a subcarrier de-modulator 68, the output of which furnishes auxiliary signal No. 2.

The frequency of the auxiliary subcarrier is placed within the modulation band of the picture carrier. As above explained it is preferably at a frequency midway between two of the higher harmonics of the picture line scanning frequency which are still within the modulation band. In this way its presence provides a minimum disturbance of the picture when it is imperfectly filtered out of the picture signal since it affects alternate lines of the picture in opposite phase. The color carrier is desirably of a frequency in the range between 0.5 and 1 mHz. The sound signal can conveniently be provided with a carrier in the frequency range from 50 to 250 kHz.

Although in principle the signal applied to the duty cycle modulator input does not need to have a carrier wave (i.e. it can be a "base-band" signal recovered directly through a low pass filter such as the low pass filter 66 of FIG. 5) it is to be understood that it is convenient to use an auxiliary carrier wave for both of the auxiliary signals, and hence following the low pass filter 66 of FIG. 5 or the filter 42 of FIG. 4 a de-modulator stage (not shown) would in such cases be used to recover the base-band signal.

It will be evident that still other variations are possible for utilizing the circuits of FIGS. 1 and 2 to provide simultaneous duty cycle and frequency modulation of a pulse generator independently with two modulating signals.

We claim:

1. Apparatus for recording a picture signal and two additional signals on a single optical record track on a moving record medium by means of a beam of radiant energy capable of modifying the surface of said medium at its incidence thereon, comprising:
   means for modulating the incidence of said radiant energy beam upon said moving record medium at main carrier and auxiliary carrier frequencies, said means for modulating at one of said carrier frequencies including an astable multivibrator having a pair of timing capacitors associated respectively with semiconductor devices by which current for altering the charge state of said capacitors can be controlled, said multivibrator being connected so as to supply one of said carrier frequencies, means for simultaneously changing the current passing capability of both of said semiconductor devices in the same direction of change in accordance with a first modulating signal and thereby modulating the frequency of the carrier provided by said multivibrator, and and means for providing differential modulation of the current passing capability of said semiconductor devices by a second modulating signal and thereby producing duty cycle modulation of the frequency modulated output of said multivibrator independently of the frequency modulation thereof, said second modulating signal being a signal other than said picture signal.

2. Apparatus as defined in claim 1 in which said means for modulating the incidence of said radiant energy beam upon said moving record medium at main carrier and auxiliary carrier frequencies are means (25) for moving said radiant energy beam back and forth in the direction of transport of said moving record medium.

3. Apparatus as defined in claim 1 in which said second modulating signal is one of said additional signals and said first modulating signal and a third modulating signal used to modulate the carrier frequency other than the carrier frequency produced by said multivibrator are respectively said picture signal and the one of said additional signals other than said second modulating signal.

4. Apparatus as defined in claim 1 in which the carrier frequency supplied by said multivibrator is said main carrier frequency, in which, further, said first modulating signal is said picture signal and in which, further, mixing means are provided and also a frequency-modulated generator of said auxiliary carrier frequency arranged for frequency modulation by one of said additional signals and said mixing means are supplied with the output of said auxiliary carrier frequency generator and with the other of said additional signals to produce at the output of said mixing means a combination of said second additional signal and of said frequency-modulated auxiliary carrier frequency, said combination constituting said second modulating signal and being furnished from the output of said mixing means to said means for providing differential modulation and thereby producing duty cycle modulation of the frequency-modulated output of said multivibrator.

5. Apparatus as defined in claim 1 in which said semiconductor devices (3a, 3b) are transistors and in which said multivibrator also includes transistors (43,44) other than the said semiconductor devices by which current for altering the charge state of said capacitors can be controlled.

6. Apparatus as defined in claim 5 in which said means for modulating the incidence of said radiant energy beam upon said moving record medium at main carrier and auxiliary carrier frequencies are means (25) for moving said radiant energy beam back and forth in the direction of transport of said moving record medium.

* * * * *